(12) United States Patent
Kuroki et al.

(10) Patent No.: US 8,360,035 B2
(45) Date of Patent: Jan. 29, 2013

(54) INTERNAL COMBUSTION ENGINE AND METHOD FOR CONTROLLING THE INTERNAL COMBUSTION ENGINE

(75) Inventors: Rentaro Kuroki, Susono (JP); Daisaku Sawada, Gotemba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 547 days.

(21) Appl. No.: 12/675,223

(22) PCT Filed: May 19, 2009

(86) PCT No.: PCT/IB2009/005656
§ 371 (c)(1),
(2), (4) Date: Feb. 25, 2010

(87) PCT Pub. No.: WO2009/141709
PCT Pub. Date: Nov. 26, 2009

(65) Prior Publication Data
US 2010/0300416 A1    Dec. 2, 2010

(30) Foreign Application Priority Data

May 20, 2008    (JP) ................................. 2008-132547

(51) Int. Cl.
*F02M 25/07* (2006.01)
*F02M 25/10* (2006.01)
*F01N 3/02* (2006.01)
*F02B 47/08* (2006.01)

(52) U.S. Cl. ..................... 123/568.11; 123/567; 60/278; 60/281; 60/309

(58) Field of Classification Search .............. 123/3, 567, 123/568.11; 60/278, 279, 281, 284–286, 60/309
See application file for complete search history.

(56) References Cited

U.S. PATENT DOCUMENTS
3,844,262 A    10/1974   Dieges
(Continued)

FOREIGN PATENT DOCUMENTS
DE    27 38 638    3/1978
JP    11 93681    4/1999
(Continued)

OTHER PUBLICATIONS

Japanese Office Action issued Jan. 17, 2012, in Patent Application 2008-132547 (with English-language translation).

*Primary Examiner* — Willis R Wolfe, Jr.
(74) *Attorney, Agent, or Firm* — Oblon, Spivak, McClelland, Maier & Neustadt, L.L.P.

(57) ABSTRACT

During starting of an engine that has a circulation path through which argon, used as working gas, is circulated back to a combustion chamber and that uses hydrogen as fuel during operation, oxygen is supplied in such a manner that the oxygen supply ratio is higher than that used during normal operation. Thus, the entirety of hydrogen supplied into the combustion chamber reacts with oxygen and is burned. When the engine is being started, because gas is not turbulent enough, hydrogen and oxygen are likely to be mixed poorly. Therefore, when oxygen is supplied in such a manner that the ratio of oxygen supply amount to the hydrogen supply amount is higher than the theoretical ratio, even if oxygen and hydrogen are not mixed so well, the chance that hydrogen contacts oxygen is increased. As a result, combustion takes place in a more appropriate manner, which improves the engine startability.

18 Claims, 7 Drawing Sheets

U.S. PATENT DOCUMENTS

| | | | |
|---|---|---|---|
| 3,982,878 A | | 9/1976 | Yamane et al. |
| 4,112,875 A | | 9/1978 | Laumann et al. |
| 4,984,426 A | * | 1/1991 | Santi .............................. 60/278 |
| 5,761,903 A | * | 6/1998 | Straka ............................ 60/278 |
| 5,881,552 A | * | 3/1999 | Iwata et al. .................... 60/284 |
| 6,823,665 B2 | * | 11/2004 | Hirota et al. ................... 60/285 |
| 6,845,610 B2 | * | 1/2005 | Shiino et al. ................... 60/286 |
| 7,059,113 B2 | * | 6/2006 | Hirota et al. ................... 60/285 |
| 7,716,918 B2 | * | 5/2010 | Gabe et al. ..................... 60/286 |
| 7,963,103 B2 | * | 6/2011 | Nagaoka et al. ................ 60/286 |
| 2008/0245349 A1 | | 10/2008 | Mitani et al. |

FOREIGN PATENT DOCUMENTS

| | | |
|---|---|---|
| JP | 2007-51613 | 3/2007 |
| JP | 2007 77834 | 3/2007 |
| JP | 2007-224846 | 9/2007 |
| WO | 2007 100115 | 9/2007 |

* cited by examiner

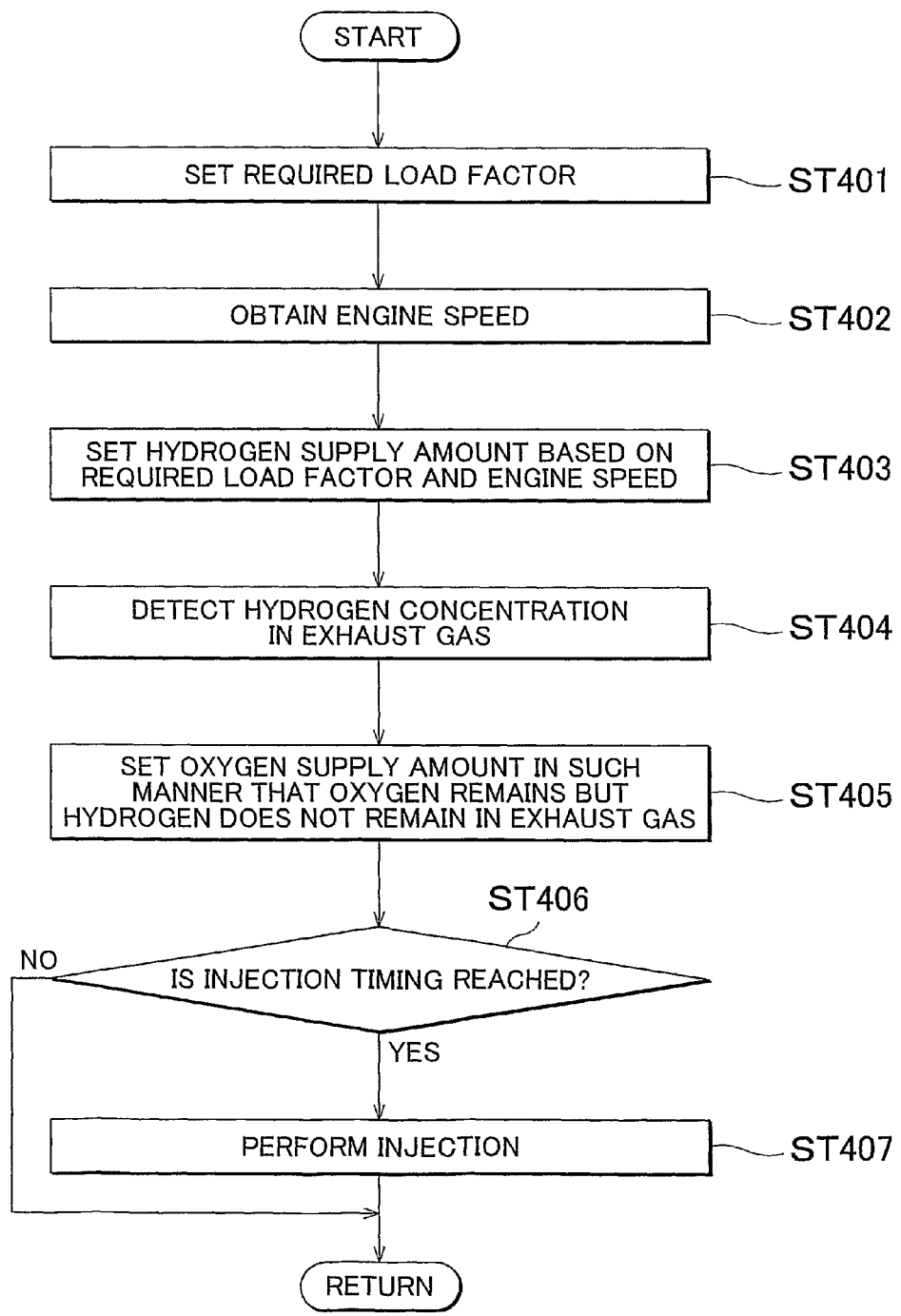

INTERNAL COMBUSTION ENGINE AND METHOD FOR CONTROLLING THE INTERNAL COMBUSTION ENGINE

BACKGROUND OF THE INVENTION

1. Field of the Invention

The invention relates generally to an internal combustion engine and a method for controlling an internal combustion engine. More specifically, the invention relates to an internal combustion engine that has a circulation path formed by connecting an exhaust passage and an intake passage to each other, and a method for controlling the internal combustion engine.

2. Description of the Related Art

Existing internal combustion engines are operated with the use of the pressure that is generated when fuel is burned in combustion chambers. There is an internal combustion engine that has a circulation path formed by connecting an exhaust passage, through which exhaust gas generated after combustion flows, and an intake passage, through which gas that is taken into a combustion chamber flows, to each other. In such an internal combustion engine, for example, hydrogen, which is used as fuel, and oxygen, which oxidizes the hydrogen, are supplied to the combustion chamber, and argon, which is used as working gas having a specific heat ratio higher than that of air, is circulated back to the combustion chamber through the circulation path. Thus, when the internal combustion engine is operated by burning the hydrogen in the combustion chamber, thermal expansion of the argon, which takes place in the combustion chamber, is also used to operate a piston. Therefore, thermal efficiency during operation of the internal combustion engine is improved. When hydrogen is burned, water is formed. However, the water is condensed and separated from the argon in a condenser provided in the circulation path. As a result, only the argon is circulated back to the combustion chamber.

However, in such an internal combustion engine, the thermal efficiency varies depending on the argon concentration in the gas taken in the combustion chamber. Therefore, the torque required when the internal combustion engine is operated is not obtained in some cases. Accordingly, some existing internal combustion engines having a circulation path are designed in such a manner that appropriate thermal efficiency is achieved. For example, in an internal combustion engine described in Japanese Patent Application Publication No. 2007-77834 (JP-A-2007-77834), argon, in addition to hydrogen and oxygen, is supplied to a combustion chamber based on the required torque. Thus, the argon concentration is brought to a value at which appropriate thermal efficiency is achieved. As a result, the required torque is obtained.

However, gases are not well-mixed as compared to the case where gas and liquid are mixed. Accordingly, as in the internal combustion engine described in JP-A-2007-77834, when gas, for example, hydrogen is used as the fuel that is burned in the combustion chamber, the hydrogen is not mixed well with oxygen that is used as an oxidant. Especially, when the internal combustion engine is being started, the gas is not turbulent enough. Therefore, the hydrogen and the oxygen tend to be mixed more poorly, which may deteriorate the engine startability.

SUMMARY OF THE INVENTION

The invention provides an internal combustion engine and a method for controlling an internal combustion engine, which improve the engine startability.

A first aspect of the invention relates to an internal combustion engine that includes: an oxidant supply device that supplies an oxidant into a combustion chamber; a reductant supply device that supplies a reductant, which is burned by reaction with the oxidant, into the combustion chamber; a circulation path which is communicated at both ends with the combustion chamber, into which exhaust gas generated after the reductant is burned in the combustion chamber flows through one of the both ends, from which gas that is taken in the combustion chamber flows into the combustion chamber through the other end, and through which working gas which is gas that has a specific heat ratio higher than a specific heat ratio of air and that is circulated back to the combustion chamber flows; and a supply amount setting unit that sets a supply amount of the reductant and a supply amount of the oxidant, wherein when the internal combustion engine is in a predetermined operating state, the supply amount setting unit sets the supply amount of the reductant and the supply amount of the oxidant in such a manner that one of a ratio of the supply amount of the reductant to the supply amount of the oxidant and a ratio of the supply amount of the oxidant to the supply amount of the reductant is higher than the one of the ratios used during normal operation.

The predetermined state may include a state where the internal combustion engine is being started, and may further include a state where the internal combustion engine is being warmed up.

According to the first aspect of the invention, when the internal combustion engine is being started, one of the ratio of the supply amount of the reductant to the supply amount of the oxidant and the ratio of the supply amount of the oxidant to the supply amount of the reductant is higher than the one of the ratios used during normal operation. Therefore, the entirety of one of the reductant and the oxidant, which is smaller in amount than the other, reacts with the other of the reductant and the oxidant, and is burned. Thus, the combustion efficiency during starting of the internal combustion engine is improved. As a result, the engine startability is improved.

In the first aspect of the invention, the supply amount setting unit may set the supply amount of the reductant and the supply amount of the oxidant in such a manner that the concentration of the reductant in the exhaust gas and the concentration of the oxidant in the exhaust gas are both equal to or lower than a predetermined concentration.

The supply amount of the reductant and the supply amount of the oxidant are set in such a manner that the concentration of the reductant in the exhaust gas and the concentration of the oxidant in the exhaust gas are both equal to or lower than the predetermined concentration. Therefore, it is possible to suppress occurrence of the situation where the concentration of the working gas in the gas that is taken in the combustion chamber is decreased due to an increase in the concentration of the reductant or the concentration of the oxidant in the exhaust gas. The exhaust gas that is discharged from the combustion chamber flows through the circulation path and is taken into the combustion chamber together with the working gas. As the concentration of the reductant or the concentration of the oxidant in the exhaust gas increases, the concentration of the working gas that flows through the circulation path decreases. Therefore, the concentration of the working gas in the gas that is taken into the combustion chamber also decreases. In contrast, when the concentration of the reductant and the concentration of the oxidant in the exhaust gas are both equal to or lower than the predetermined concentration, a decrease in the concentration of the working gas that flows through the circulation path is suppressed, and consequently, a decrease in the concentration of the working gas in the gas that is taken into the combustion chamber is suppressed. Thus, the reductant is burned in the combustion chamber in the state where the concentration of the working gas having a high specific heat ratio is sufficiently high. As a result, it is possible to suppress reduction in the thermal efficiency.

In the first aspect of the invention, the supply amount setting unit may set the supply amount of the reductant and the supply amount of the oxidant in such a manner that one of the reductant and the oxidant is constantly contained in the exhaust gas but the other of the reductant and the oxidant is not contained in the exhaust gas during normal operation of the internal combustion engine.

One of the reductant and the oxidant is constantly contained in the exhaust gas but the other of the reductant and the oxidant is not contained in the exhaust gas during normal operation of the internal combustion engine. Therefore, it is possible to suppress occurrence of the situation where both the reductant and the oxidant flow through the circulation path. As a result, it is possible to suppress occurrence of the situation where the reductant and the oxidant are mixed together and the reductant self-ignites in the circulation path.

In the first aspect of the invention, a concentration detection unit that detects at least one of the concentrations of the reductant and the oxidant in the exhaust gas that flows through the circulation path may be provided in the circulation path, and the supply amount setting unit may set the supply amount of the reductant and the supply amount of the oxidant based on a detection result obtained by the concentration detection unit.

The supply amount of the reductant and the supply amount of the oxidant are set based on the detection result obtained by the concentration detection unit. Therefore, it is possible to more reliably bring the supply amount of the reductant and the supply amount of the oxidant to desired supply amounts. As a result, it is possible to more accurately improve the engine startability.

A second aspect of the invention relates to a method for controlling an internal combustion engine that includes an oxidant supply device that supplies an oxidant into a combustion chamber, a reductant supply device that supplies a reductant, which is burned by reaction with the oxidant, into the combustion chamber, and a circulation path which is communicated at both ends with the combustion chamber, into which exhaust gas generated after the reductant is burned in the combustion chamber flows through one of the both ends, from which gas that is taken in the combustion chamber flows into the combustion chamber through the other end, and through which working gas which is gas that has a specific heat ratio higher than a specific heat ratio of air and that is circulated back to the combustion chamber flows. According to the method, a supply amount of the reductant and a supply amount of the oxidant are set. When the internal combustion engine is in a predetermined operating state, the supply amount of the reductant and the supply amount of the oxidant are set in such a manner that one of a ratio of the supply amount of the reductant to the supply amount of the oxidant and a ratio of the supply amount of the oxidant to the supply amount of the reductant is higher than the one of the ratios used during normal operation.

With the internal combustion engine and the method for controlling the internal combustion engine according to the aspects of the invention described above, it is possible to improve the engine startability.

BRIEF DESCRIPTION OF THE DRAWINGS

The features, advantages and technical and industrial significance of this invention will be described in the following detailed description of example embodiments of the invention with reference to the accompanying drawings, wherein the same or corresponding portions will be denoted by the same reference numerals and wherein:

FIG. 7 is a flowchart showing the routine for controlling the engine according to another modification of the embodiment of the invention.

DETAILED DESCRIPTION OF THE EMBODIMENT

Hereafter, an embodiment of the invention will be described with reference to the accompanying drawings.

Figure 1:
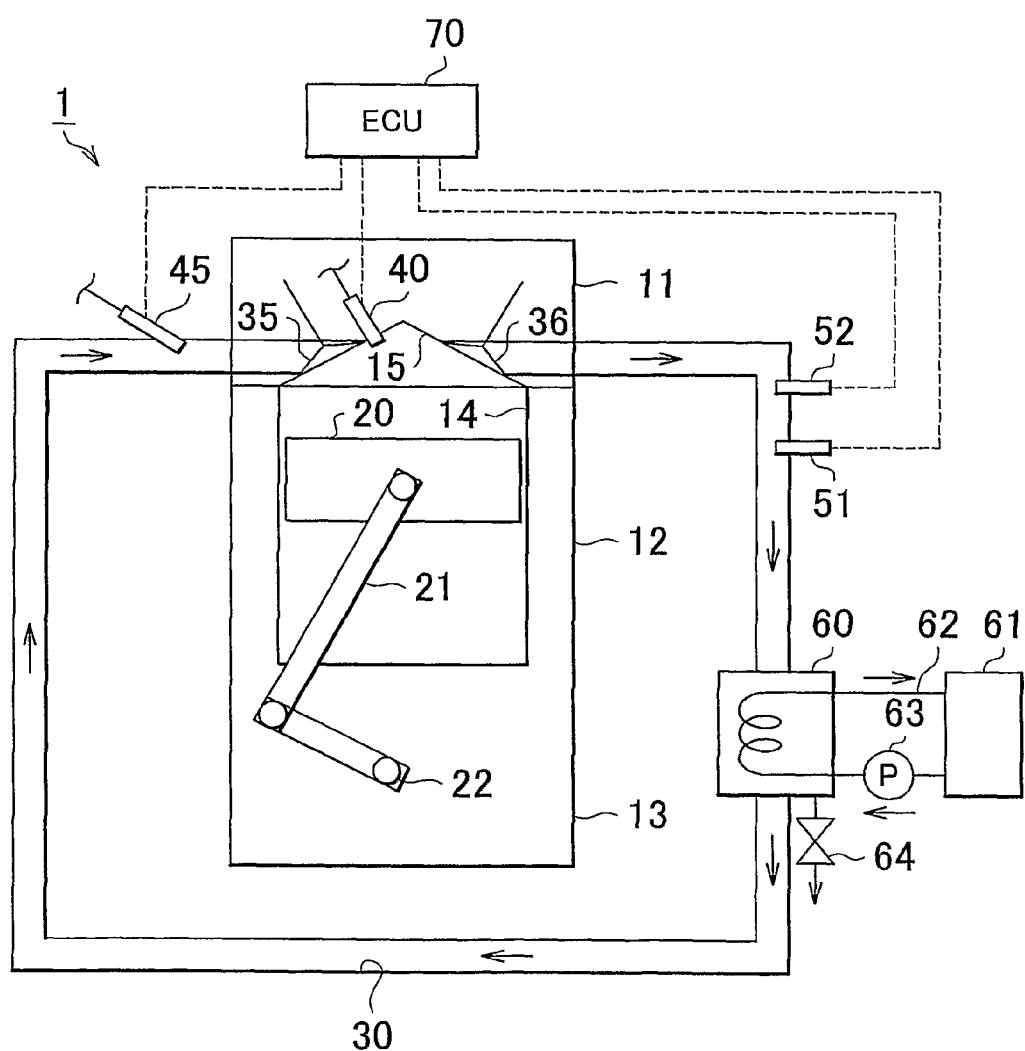
FIG. 1 is a view schematically showing the structure of an engine according to an embodiment of the invention.

FIG. 1 is a view schematically showing the structure of an engine 1 according to the embodiment of the invention. The engine 1, which is an internal combustion engine according to the embodiment of the invention shown in FIG. 1, includes a cylinder head 11 and a cylinder block 12. A crankcase 13 is arranged at a position on the opposite side of the cylinder block 12 from the cylinder head 11. A cylinder 14 is formed within the cylinder block 12. A piston 20 is provided in such a manner that the piston 20 may reciprocate within the cylinder 14. A crankshaft 22 is provided at a position close to the bottom dead center which is reached by the piston 20 during operation of the engine 1. The crankshaft 22 is provided within the crankcase 13, and has the rotational axis that is perpendicular to the direction in which the piston 20 reciprocates. The crankshaft 22 may rotate about the rotational axis. The thus provided piston 20 and crankshaft 22 are connected to each other via a connecting rod 21. Thus, the crankshaft 22 may rotate in accordance with the reciprocation of the piston 20. A combustion chamber 15 is defined by a face of the cylinder head 11, which faces the piston 20, a wall face of the cylinder 14, and a face of the piston 20, which faces the cylinder head 11.

A circulation path 30, which is communicated at both ends with the combustion chamber 15, is connected to the cylinder head 11. The circulation path 30 is formed as a path through which argon may flow. Argon has a specific heat ratio that is higher than that of air, and is used as working gas which is circulated back to the combustion chamber 15 through the circulation path 30. The combustion chamber 15, which is communicated with the thus formed circulation path 30, is provided with an intake valve 35 and an exhaust valve 36. The intake valve 35 permits and shuts off communication between the circulation path 30 and the combustion chamber 15. The exhaust valve 36 permits and shuts off the communication between the circulation path 30 and the combustion chamber 15. The intake valve 35 is provided at one end of the circulation path 30, and the exhaust valve 36 is provided at the other end of the circulation path 30.

The intake valve 35 and the exhaust valve 36 may be arranged so as to permit and shut off communication between the circulation path 30 and the combustion chamber 15 with the use of a cam (not shown) fitted on a camshaft (not shown) that rotates in accordance with the rotation of the crankshaft 22. Alternatively, the intake valve 35 and the exhaust valve 36 may be so-called electromagnetically-driven valves which include solenoids. In this case, the intake valve 35 and the exhaust valve 36 permit and shut off communication between the circulation path 30 and the combustion chamber 15 under an electric action. The manner in which the intake valve 35 and the exhaust valve 36 are actuated is not particularly limited as long as the intake valve 35 and the exhaust valve 36 may permit and shut off communication between the circulation path 30 and the combustion chamber 15.

In the circulation path 30 that is communicated with the combustion chamber 15, there is provided an oxygen supply device 45 that supplies oxygen ($O_2$), which is used as an oxidant, to the combustion chamber 15. An oxygen tank (not shown) that stores oxygen is connected to the oxygen supply device 45. The oxygen supply device 45 is arranged in such a manner that the oxygen supply device 45 may supply oxygen to the combustion chamber 15 by injecting the oxygen from the oxygen tank into the circulation path 30.

The cylinder head 11 is provided with a hydrogen supply device 40 that supplies hydrogen, which is a reductant that is burned by the reaction with the oxygen, into the combustion chamber 15. A hydrogen tank (not shown) that stores hydrogen is connected to the hydrogen supply device 40. The hydrogen supply device 40 is arranged in such a manner that the hydrogen supply device 40 may inject the hydrogen from the hydrogen tank into the combustion chamber 15.

In the circulation path 30, there are provided a hydrogen sensor 51, which detects the hydrogen concentration in the gas that flows through the circulation path 30, and an oxygen sensor 52, which detects the oxygen concentration in the gas that flows through the circulation path 30. The hydrogen sensor 51 and the oxygen sensor 52 are provided in the circulation path 30 at positions closer to the exhaust valve 36 than to oxygen supply device 45. The hydrogen sensor 51 and the oxygen sensor 52 are provided at the positions close to the end of the circulation path 30.

In the circulation path 30, there is provided a condenser 60 that condenses the water content flowing through the circulation path 30 into condensate water. A coolant passage 62 through which a coolant (not shown) flows is formed within the condenser 60. A radiator 61 is connected to the coolant passage 62. The radiator 61 and the coolant passage 62 form a closed path, and a water pump 63 is provided in the coolant passage 62. The coolant is circulated though the coolant passage 62 and the radiator 61 when the water pump 63 is operated.

The condenser 60 is provided with a discharge valve 64, and the condensate water formed in the condenser 60 is discharged to the outside of the condenser 60 when the discharge valve 64 is opened. The thus formed condenser 60 is provided in the circulation path 60 at a position between the hydrogen sensor 51 and the oxygen sensor 52, and the oxygen supply device 45.

The hydrogen supply device 40, the oxygen supply device 45, the hydrogen sensor 51, and the oxygen sensor 52 are connected to an ECU (Electronic Control Unit) 70 that controls various portions (not shown) of a vehicle that includes the engine 1. The hydrogen supply device 40, the oxygen supply device 45, the hydrogen sensor 51 and the oxygen sensor 52 are controlled by the ECU 70.

Figure 2:
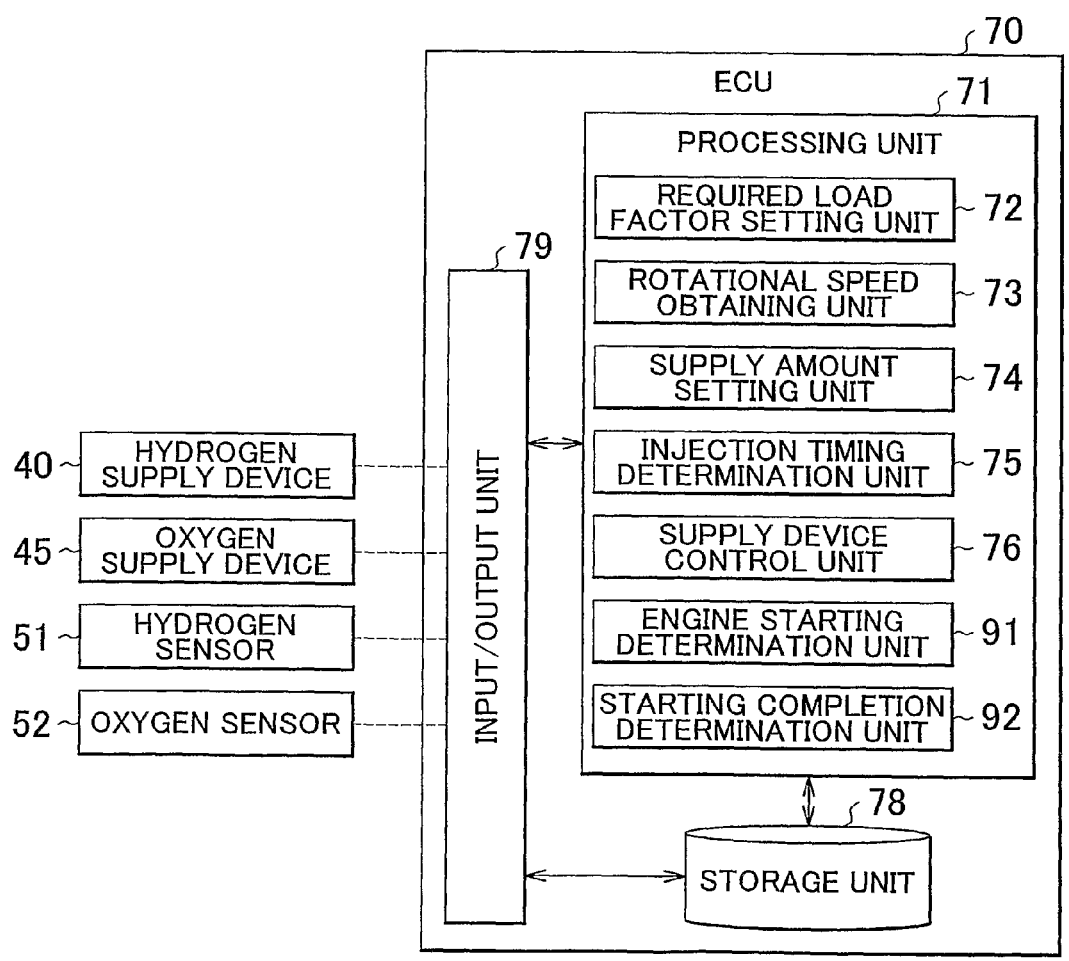
FIG. 2 is a view showing the configuration of main portions of the engine in FIG. 1.

FIG. 2 is a view schematically showing main portions of the engine 1 shown in FIG. 1. The ECU 70 includes a processing unit 71, a storage unit 78 and an input/output unit 79. The processing unit 71, the storage unit 78 and the input/output unit 79 are connected to each other so that these units may exchange signals. The hydrogen supply device 40, the oxygen supply device 45, the hydrogen sensor 51, the oxygen sensor 52 are connected to the input/output unit 79 of the ECU 70, and the input/output unit 79 transmits/receives signals to/from these devices and sensors. The storage unit 78 stores computer programs that are used to control the engine 1 according to the embodiment of the invention. The storage unit 78 may be formed of a hard disk unit, a magnetic optical disk unit, a nonvolatile memory, for example, a flash memory (read-only storage medium, for example, a CD-ROM), a volatile memory, for example, a RAM (Random-Access Memory), or a combination of these components.

The processing unit 71 is formed of a memory and a CPU (Central Processing Unit). The processing unit 71 includes a required load factor setting unit 72 that sets the required load factor, which is the load that is required of the engine 1, a rotational speed obtaining unit 73 that obtains the rotational speed of the engine 1 during operation, a supply amount setting unit 74 that sets the amount of hydrogen that is supplied from the hydrogen supply device 40 and the amount of oxygen that is supplied from the oxygen supply device 45, an injection timing determination unit 75 that determines whether the timing, at which the hydrogen is supplied from the hydrogen supply device 40, or the timing, at which the oxygen is supplied from the oxygen supply device 45, is reached, a supply device control unit 76 that controls the hydrogen supply device 40 and the oxygen supply device 45, an engine starting determination unit 91 that determines whether the engine 1 is being started, and a starting completion determination unit 92 that determines whether starting of the engine 1 has been completed.

The ECU 70 controls, for example, the hydrogen supply device 40 in the following manner. The processing unit 72 reads the computer program into the memory incorporated in the processing unit 71, executes computation based on the detection result obtained by, for example, the hydrogen sensor 51, and executes the control based on the result of computation. In this process, the processing unit 71 stores the numeric values in the storage unit 78 in the middle of the computation, takes out the stored numeric values, and executes computation using these numeric values. When, for example, the hydrogen supply device 40 is controlled in this manner, dedicated hardware that differs from the ECU 70 may be used instead of the computer program.

The engine 1 according to the embodiment of the invention has the above-described structure. The effects thereof will be described below. During operation of the engine 1, the piston 20 reciprocates within the cylinder 14, whereby an engine cycle formed of an intake stroke, a compression stroke, a power stroke, and an exhaust stroke is repeated. The reciprocation of the piston 20 is transmitted to the crankshaft 22 via the connecting rod 21, and the reciprocation is converted into the rotation by the actions of the connecting rod 21 and the crankshaft 22, whereby the crankshaft 22 is rotated. During operation of the engine 1, hydrogen is injected from the hydrogen supply device 40 and oxygen is injected from the oxygen supply device 45 based on the rotational position of the crankshaft 22, the accelerator pedal operation amount, which is an amount by which an accelerator pedal (not shown) provided at a driver's seat of the vehicle is operated, etc. During operation of the engine 1, the intake valve 35 and the exhaust valve 36 reciprocate based on the rotational position of the crankshaft 22, whereby communication between the circulation path 30 and the combustion chamber 15 is repeatedly permitted and shut off.

During operation of the engine 1, the intake valve 35 and the exhaust valve 36 reciprocate and communication between the circulation path 30 and the combustion chamber 15 is repeatedly permitted and shut off. Thus, the air is taken into the combustion chamber 15 and the exhaust gas is discharged from the combustion chamber 15, and the four engine strokes are repeated. In the intake stroke, the intake valve 35 is opened and the exhaust valve 36 is closed while the oxygen is injected from the oxygen supply device 45. Thus, the piston 20 moves from the top dead center side toward the bottom dead center, whereby the argon that flows through the circulation path 30 and the oxygen that is injected into the circulation path 30 are taken into the combustion chamber 15 from the circulation path 30 via the intake valve 35. That is, the gas flows into the combustion chamber 15 from the end portion of the circulation path 30, which is on the intake valve 35 side. In the compression stroke, the intake valve 35 and the exhaust valve 36 are both closed. The piston 20 moves toward the top dead center in this state, whereby the gas in the combustion chamber 15 is compressed. Due to this compression, the temperatures of the oxygen and the argon, which are contained in the gas in the combustion chamber 15, increase.

In the power stroke, the hydrogen is injected from the hydrogen supply device 40, and the hydrogen and the oxygen are mixed together in the combustion chamber 15. The temperature of the oxygen is increased in the compression stroke. Therefore, when the hydrogen and the oxygen are mixed together, the hydrogen reacts with the oxygen. As a result, the hydrogen self-ignites and is burned. When the hydrogen is burned in this manner, the pressure and the temperature increase rapidly, and the piston 20 moves toward the bottom dead center due to this pressure. The crankshaft 22 that is connected to the piston 20 via the connecting rod 21 rotates in accordance with the movement of the piston 20. When the hydrogen is burned in this manner, the heat that is increased during combustion is transferred to the argon and the temperature of the argon also increases. The specific heat ratio of the argon is higher than that of air. Therefore, when the temperature of the argon is increased, the argon attempts to expand greatly and applies a pressure to the piston 20. Accordingly, the piston 20 moves toward the bottom dead center by not only the pressure generated during combustion of the hydrogen but also the pressure generated due to expansion of the argon. The crankshaft 22 rotates in accordance with the movement of the piston 20.

In the exhaust stroke, the piston 20 moves toward the top dead center while the intake valve 35 is closed and the exhaust valve 36 is open, whereby the exhaust gas obtained after combustion of the hydrogen is discharged from the combustion chamber 15 to the circulation path 30 through the end of the circulation path 30, which is on the exhaust valve 36 side. That is, the exhaust gas that is obtained after the hydrogen is burned in the combustion chamber 15 flows into the circulation path 30 from the combustion chamber 15. At this time, the argon in the combustion chamber 15 flows into the circulation path 30 together with the exhaust gas obtained after the hydrogen is burned. When the hydrogen is burned, a chemical reaction between the hydrogen and the oxygen occurs and water ($H_2O$) is formed. Therefore, the main component of the exhaust gas that is obtained after the hydrogen is burned is a water content, and the water content in the form of water vapor flows into the circulation path 30.

The gas such as the exhaust gas and the argon flows from the end of the circulation path 30, which is on the exhaust valve 36 side, toward the end of the circulation path 30, which is on the intake valve 35 side. At this time, the gas flows into the condenser 60 that is provided in the circulation path 30. The coolant passage 62 through which the coolant flows is formed in the condenser 60. The gas introduced into the condenser 60 exchanges heat with the coolant that flows through the coolant passage 62 formed in the condenser 60. The coolant is circulated back to the radiator through the coolant passage 62. The coolant radiates heat when passing through the radiator 61, whereby the temperature of the coolant decreases. Therefore, when the coolant flows into the coolant passage 62 formed in the condenser 60, the temperature of the coolant is low. Accordingly, when the gas introduced into the condenser 60 exchanges heat with the coolant that flows through the coolant passage 62 formed in the condenser 60, the heat of the gas is transferred to the coolant and the temperature of the gas decreases. Accordingly, the water vapor, which is the main component of the exhaust gas contained in the gas is condensed into water in liquid form due to a decrease in the temperature of the gas. Then, the water is removed from the gas flowing through the circulation path 30. The water condensed in the condenser 60 is discharged from the condenser 60 when the discharge valve 64 is opened under the control executed by the ECU 70.

The gas, of which the temperature is decreased and from which water is removed in the condenser 60, flows out of the condenser 60, flows through the circulation path 30 toward the end of the circulation path 30, which is on the intake valve 35 side, and is taken in the combustion chamber 15 during the intake stroke. That is, the argon, which is used as the working gas, is circulated back to the combustion chamber 15 through the circulation path 30.

During operation of the engine 1, the argon is circulated back to the combustion chamber 15 through the circulation path 30. In this case, the residual hydrogen and oxygen that are not used during combustion in the combustion chamber 15 may form exhaust gas and be discharged from the combustion chamber 15 into the circulation path 30. In the engine 1 according to the embodiment of the invention, the amount of hydrogen supply (hereinafter, referred to as "hydrogen supply amount") and the amount of oxygen supply (hereinafter, referred to as "oxygen supply amount") are adjusted in such a manner that the hydrogen concentration and the oxygen concentration in the exhaust gas that is discharged from the combustion chamber 15 into the circulation path 30 are equal to or lower than a predetermined concentration. More specific description will be provided below. The amount of hydrogen injected from the hydrogen supply device 40 and the amount of oxygen injected from the oxygen supply device 45, that is, the hydrogen supply amount and the oxygen supply amount are set by the supply amount setting unit 74 of the processing unit 71 in the ECU 70 based on the accelerator pedal operation amount and the operating state of the engine 1. The supply amount setting unit 74 sets the hydrogen supply amount and the oxygen supply amount in such a manner that the hydrogen concentration and the oxygen concentration in the exhaust gas are both equal to or lower than the predetermined concentration.

Figure 3:
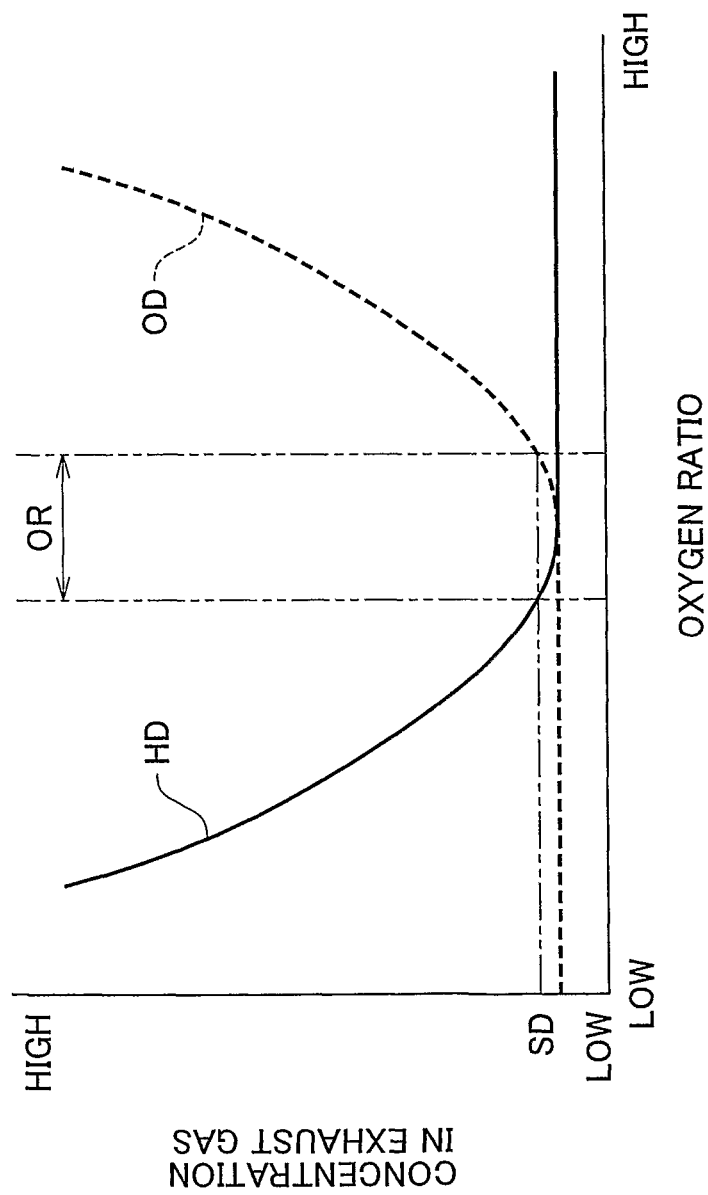
FIG. 3 is a graph showing the relationship between the oxygen supply ratio, and the hydrogen concentration and the oxygen concentration in exhaust gas.

FIG. 3 is a graph showing the relationship between the oxygen supply ratio, and the hydrogen concentration and the oxygen concentration in the exhaust gas. In FIG. 3, the abscissa axis represents the oxygen supply ratio that is the ratio of the oxygen supply amount to the hydrogen supply amount. The ratio of the oxygen supply amount to the hydrogen supply amount increases toward the right side of FIG. 3, and decreases toward the left side of FIG. 3. The ordinate axis represents the hydrogen concentration or the oxygen concentration in the exhaust gas. The hydrogen concentration and the oxygen concentration increase toward the upper side of FIG. 3, and decrease toward the lower side of FIG. 3. The supply amount setting unit 74 sets the hydrogen supply amount and the oxygen supply amount in such a manner that the hydrogen concentration and the oxygen concentration in the exhaust gas are both equal to or lower than the predetermined concentration.

When the ratio of the oxygen supply amount to the hydrogen supply amount is excessively high, the oxygen partially remains unused after the hydrogen is burned in the combustion chamber 15. Therefore, a hydrogen concentration HD, which is the hydrogen concentration in the exhaust gas, decreases, whereas an oxygen concentration OD, which is the oxygen concentration, increases. On the other hand, when the ratio of the oxygen supply amount to the hydrogen supply amount is excessively low, the hydrogen partially remains unused after the hydrogen is burned in the combustion chamber 15. Therefore, the hydrogen concentration HD in the exhaust gas increases, whereas the oxygen concentration OD in the exhaust gas decreases.

As shown in FIG. 3, the hydrogen concentration HD and the oxygen concentration OD in the exhaust gas change based on the oxygen supply ratio as shown in FIG. 3, and one of the hydrogen concentration HD and the oxygen concentration OD is likely to be high. However, the supply amount setting unit 74 sets the hydrogen supply amount and the oxygen supply amount in such a manner that the hydrogen concentration HD and the oxygen concentration OD are both equal to or lower than a reference concentration SD, which is the predetermined concentration. In other words, the supply amount setting unit 74 sets the hydrogen supply amount and the oxygen supply amount in such a manner that the hydrogen concentration HD and the oxygen concentration OD are both within a concentration range that corresponds to an oxygen supply ratio optimum range OR in which the oxygen supply amount is neither excessive nor insufficient and the oxygen supply ratio is optimum.

The reference concentration SD that is used to set the hydrogen supply amount and the oxygen supply amount is stored in the storage unit 78 of the ECU 70 in advance. When the supply amount setting unit 74 sets the hydrogen supply amount and the oxygen supply amount in such a manner that the hydrogen concentration HD and the oxygen concentration OD are both equal to or lower than the reference concentration SD, the supply amount setting unit 74 sets the hydrogen supply amount and the oxygen supply amount based on the hydrogen concentration in the exhaust gas, which is detected by the hydrogen sensor 51, and the oxygen concentration in the exhaust gas, which is detected by the oxygen sensor 52.

Figure 4:
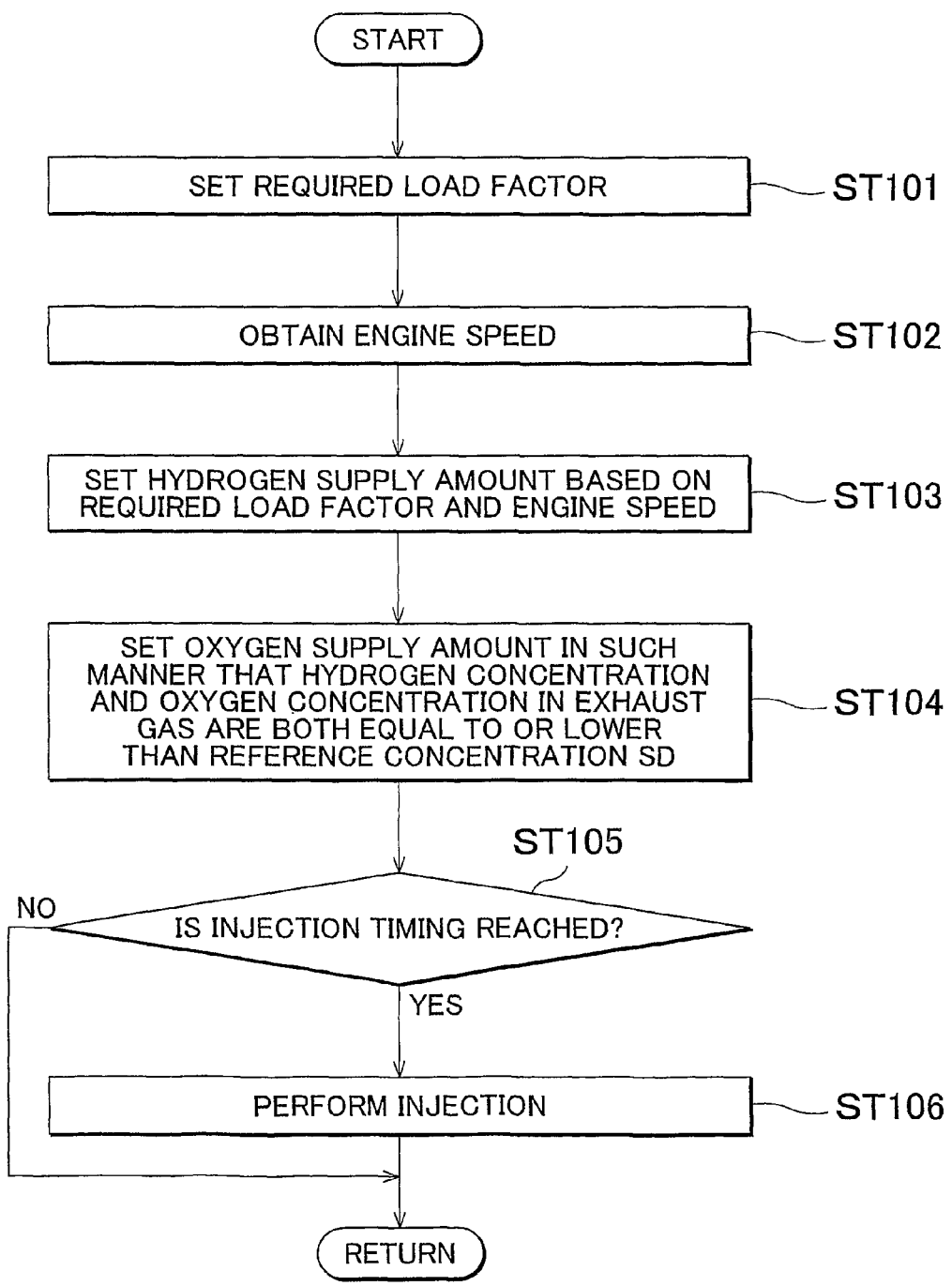
FIG. 4 is a flowchart showing the routine executed during normal operation of the engine according to the embodiment of the invention.

FIG. 4 is a flowchart showing the routine executed during normal operation of the engine 1 according to the embodiment of the invention. The method for controlling the engine 1 according to the embodiment of the invention, that is, the routine for controlling the engine 1 will be described below. The routine is executed at predetermined time intervals when each portion is controlled during operation of the engine 1. In the routine for controlling the engine 1 according to the embodiment of the invention, first, the required load factor is set (ST101). The required load factor setting unit 72 of the processing unit 71 in the ECU 70 sets the required load factor. The required load factor setting unit 72 obtains the accelerator pedal operation amount, and sets the required load factor, which indicates the load that a driver of the vehicle requires of the engine 1.

Next, the engine speed is obtained (ST102). The rotational speed obtaining unit 73 of the processing unit 71 in the ECU 70 obtains the engine speed. The rotational speed obtaining unit 73 obtains the engine speed by obtaining the angular speed of the crankshaft 22 based on detection result obtained by a crank angle sensor (not shown) which is provided at the engine 1 and which detects the angular speed of the crankshaft 22.

Next, the hydrogen supply amount is set based on the load factor and the engine speed (ST103). The supply amount setting unit 74 of the processing unit 71 in the ECU 70 sets the hydrogen supply amount. The supply amount setting unit 74 sets the hydrogen supply amount at which the required load factor, which is set by the required load factor setting unit 72, is achieved when the rotational speed of the engine 1 agrees with the rotational speed obtained by the rotational speed obtaining unit 73, based on the required load factor set by the required load factor setting unit 72 and the engine speed obtained by the rotational speed obtaining unit 73.

Next, the oxygen supply amount is set in such a manner that the hydrogen concentration and the oxygen concentration in the exhaust gas are both equal to or lower than the reference concentration SD (ST104). The supply amount setting unit 74 sets the oxygen supply amount in a manner similar to the manner in which the hydrogen supply amount is set. The supply amount setting unit 74 sets the oxygen supply amount based on the hydrogen supply amount set by the supply amount setting unit 74. The supply amount setting unit 74 sets the amount of oxygen that is supplied from the oxygen supply device 45 to the oxygen supply amount at which the hydrogen concentration and the oxygen concentration in the exhaust gas are both equal to or lower than the reference concentration SD, which is stored in the storage unit 78 in advance, when the hydrogen is burned in the combustion chamber 15.

Next, whether the injection timing is reached is determined (ST105). The injection timing determination unit 75 of the processing unit 71 in the ECU 70 determines whether the injection timing is reached. The injection timing determination unit 75 determines which of the intake stroke, the compression stroke, the power stroke and the exhaust is currently executed based on the detection result obtained by the crank angle sensor. Based on the determination, it is determined whether the injection timing for the hydrogen supply device 40 or the injection timing for the oxygen supply device 45 is reached. More specifically, during the intake stroke or immediately before the intake stroke, the injection timing determination unit 75 determines that timing at which oxygen is injected from the oxygen supply device 45 is reached. During the power stroke or immediately before the power stroke, the injection timing determination unit 75 determines that the injection timing at which hydrogen is injected from the hydrogen supply device 40 is reached. In other states, the injection timing determination unit 75 determines that the injection timing is not reached. If the injection timing determination unit 75 determines that neither the hydrogen injection timing nor the oxygen injection timing is reached, the control routine ends.

If the injection timing determination unit 75 determines in ST105 that the hydrogen injection timing or the oxygen injection timing is reached, the injection is performed (ST106). The injection is performed under the control executed by the supply device control unit 76 of the processing unit 71 in the ECU 70. One of the hydrogen and the oxygen is injected under the control executed by the supply device control unit 76. Which of the hydrogen injection timing and the oxygen injection timing is reached is determined by the injection timing determination unit 75. That is, if the injection timing determination unit 75 determines that the timing at which hydrogen is injected from the hydrogen supply device 40 is reached, the hydrogen is injected from the hydrogen supply device 40. On the other hand, if the injection timing determination unit 75 determines that the timing at which oxygen is injected from the oxygen supply device 45 is reached, the oxygen is injected from the oxygen supply device 45.

When the injection is performed in the above-described manner, the injection is performed in an injection amount that is set by the supply amount setting unit 74. That is, when the hydrogen is injected from the hydrogen supply device 40, the supply device control unit controls the hydrogen supply device 40 in such a manner that the hydrogen is injected in the supply amount that is set by the supply amount setting unit 74 in ST103. Thus, the set supply amount of hydrogen is injected from the hydrogen supply device 40. Similarly, when the oxygen is injected from the oxygen supply device 45, the supply device control unit 76 controls the oxygen supply device 45 in such a manner that the oxygen is injected in the supply amount that is set by the supply amount setting unit 74 in ST104. Thus, the set supply amount of oxygen is injected from the oxygen supply device 45. After the injection is performed, the routine ends.

Figure 5:
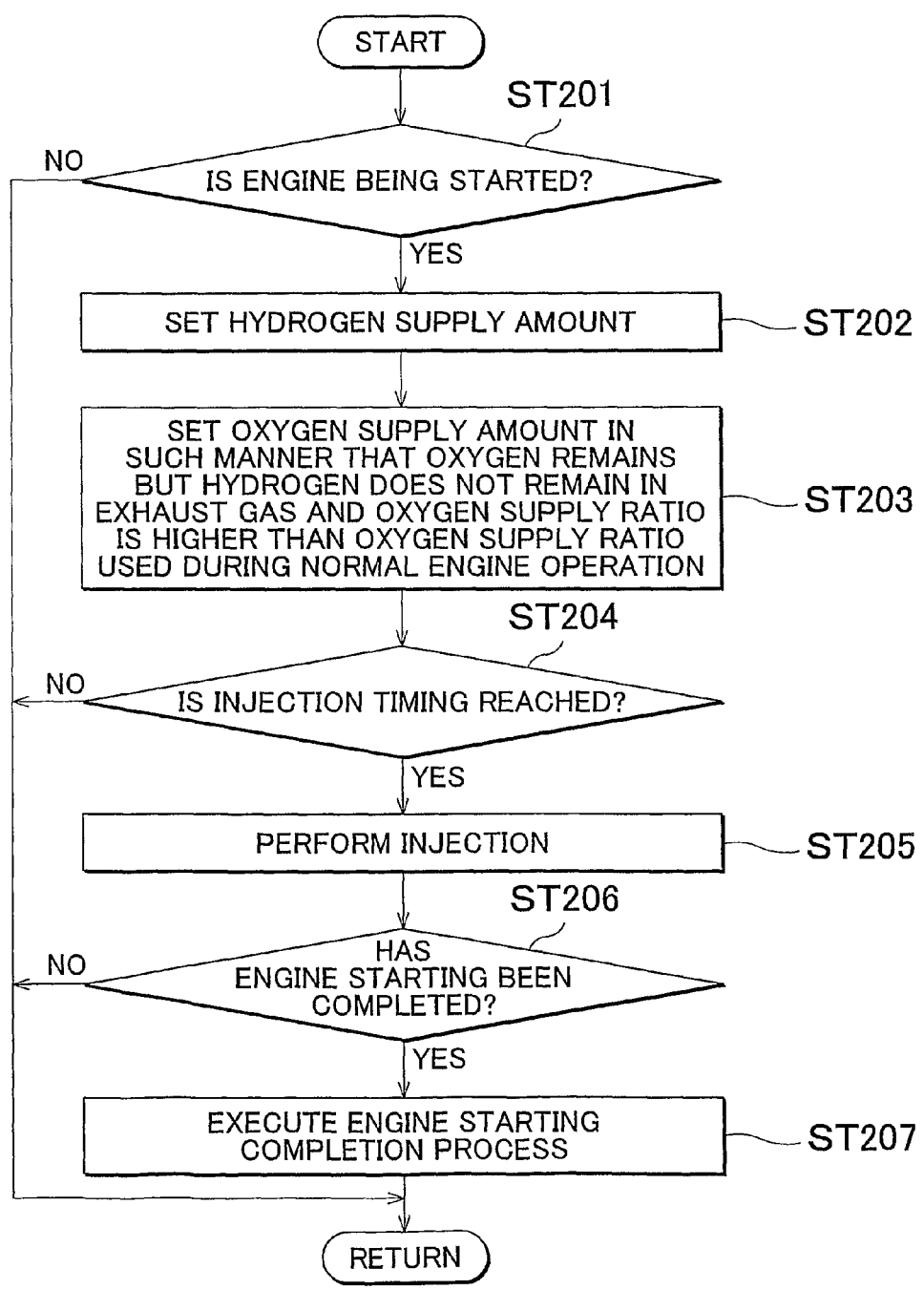
FIG. 5 is a flowchart showing the routine executed when the engine according to the embodiment of the invention is being started.

FIG. 5 is a flowchart showing the routine that is executed when the engine 1 according to the embodiment of the invention is being started. When the engine 1 is being started, the control that differs from the control that is executed when the engine 1 is operating normally. In the control executed for engine starting time, it is determined whether the engine is being started (ST201). The engine starting determination unit 91 of the processing unit 71 in the ECU 70 determines whether the engine 1 is being started. The engine starting determination unit 91 obtains the rotational speed of the engine 1 based on the detection result obtained by the crank angle sensor. When the rotational speed of the engine 1 is equal to or lower than a predetermined rotational speed, it is determined that the engine 1 is being started. On the other hand, when the rotational speed of the engine 1 is higher than the predetermined rotational speed, it is determined that the engine 1 is not being started, that is, the engine is operating normally. If it is determined that the engine 1 is not being started, the routine ends.

If the engine starting determination unit 91 determines in ST201 that the engine 1 is being started, the hydrogen supply amount is set (ST202). The supply amount setting unit 74 sets the hydrogen supply amount. If the engine starting determination unit 91 determines that the engine 1 is being started, the supply amount setting unit 74 sets the amount of hydrogen that is supplied from the hydrogen supply device 40 to the amount of hydrogen that is required to start the engine 1. The amount of hydrogen that is required to start the engine 1 is stored in the storage unit 78 of the ECU 70 in advance. When the engine 1 is being started, the supply amount setting unit 74 sets the amount of hydrogen that is required to start the engine 1 to the hydrogen amount stored in the storage unit 78.

Next, the oxygen supply amount is set in such a manner that the oxygen remains but the hydrogen does not remain in the exhaust gas and the oxygen supply ratio is higher than the oxygen supply ratio that is used during normal engine operation (ST203). The supply amount setting unit 74 sets the oxygen supply amount. The supply amount setting unit 74 sets the oxygen supply amount in such a manner that the hydrogen concentration in the exhaust gas is zero and the oxygen supply ratio is higher than the oxygen supply ratio that is used during normal engine operation. That is, based on the hydrogen supply amount set by the supply amount setting unit 74, the supply amount setting unit 74 sets the amount of oxygen that is supplied from the oxygen supply device 45 to the oxygen amount at which the hydrogen concentration in the exhaust gas is zero and the oxygen concentration is higher than the oxygen concentration during normal engine operation after the set supply amount of hydrogen is burned in the combustion chamber 15.

Next, the injection timing determination unit 75 determines whether the injection timing for the hydrogen supply device 40 or the injection timing for the oxygen supply device 45 is reached (ST204). If it is determined that that neither the hydrogen injection timing nor the oxygen injection timing is reached, the routine ends. If the injection timing determination unit 75 determines in ST204 that the hydrogen injection timing or the oxygen injection timing is reached, the supply device control unit 76 controls the hydrogen supply device 40 or the oxygen supply device 45, and performs injection of oxygen or the hydrogen (ST205). Which of the hydrogen injection timing and the oxygen injection timing is reached is determined by the injection timing determination unit 75.

Next, it is determined whether starting of the engine 1 has been completed (ST206). The starting completion determination unit 92 of the processing unit 71 in the ECU 70 determines whether starting of the engine 1 has been completed. The starting completion determination unit 92 obtains the rotational speed of the engine 1 based on the detection result obtained by the crank angle sensor. When the rotational speed of the engine 1 is equal to or higher than a predetermined rotational speed, it is determined that the hydrogen is continuously burned stably in the combustion chamber 15 and starting of the engine 1 has been completed. On the other hand, when the rotational speed of the engine 1 is lower than the predetermined rotational speed, it is determined that starting of the engine 1 has not been completed. If it is determined that starting of the engine 1 has not been completed, the routine ends.

If the starting completion determination unit 92 determines in ST206 that starting of the engine 1 has been completed, a starting completion process is executed (ST207). If it is determined that starting of the engine 1 has been completed, the hydrogen supply amount and the oxygen supply amount, which are set by the supply amount setting unit 74, are reset to the supply amounts that are used during normal operation of the engine 1.

When the above-described engine 1 is being started, the oxygen is supplied in such a manner that the oxygen remains but the hydrogen does not remain in the exhaust gas and the oxygen supply ratio is higher than the oxygen supply ratio that is used during normal engine operation. Therefore, the entirety of the hydrogen supplied into the combustion chamber 15 reacts with the oxygen and is burned. When the engine is being started, the hydrogen and the oxygen are likely to be mixed poorly because the gas is not turbulent enough. Therefore, the oxygen is supplied in such a manner that the ratio of the oxygen supply amount to the hydrogen supply amount is higher than the theoretical ratio of the oxygen supply amount to the hydrogen supply amount. In this way, even if the hydrogen and the oxygen are not mixed very well, it is possible to increase the chance that the hydrogen contacts the oxygen. As a result, the combustion takes place in a more appropriate manner when the engine 1 is being started, which improves the engine startability.

The hydrogen supply amount and the oxygen supply amount are set in such a manner that the hydrogen concentration and the oxygen concentration in the exhaust gas are both equal to or lower than the reference concentration DS. Therefore, it is possible to suppress occurrence of the situation where the argon concentration in the gas that is taken in the combustion chamber 15 is decreased due to an increase in the hydrogen concentration or the oxygen concentration in the exhaust gas. The exhaust gas that is discharged from the combustion chamber 15 flows through the circulation path 30 and is taken into the combustion chamber 15 together with the argon. As the hydrogen concentration or the oxygen concentration in the exhaust gas increases, the concentration of argon that flows through the circulation path 30 decreases. Therefore, the argon concentration in the gas that is taken into the combustion chamber 15 also decreases. In contrast, when the hydrogen concentration and the oxygen concentration in the exhaust gas are both equal to or lower than the reference concentration SD, a decrease in the concentration of argon that flows through the circulation path 30 is suppressed, and consequently, a decrease in the concentration of argon in the gas that is taken into the combustion chamber 15 is suppressed. Thus, the hydrogen is burned in the combustion chamber 15 in the state where the concentration of argon, which is used as the working gas having a high specific heat ratio, is sufficiently high. As a result, it is possible to suppress reduction in the thermal efficiency.

Because reduction in the thermal efficiency is suppressed, it is possible to decrease the hydrogen supply amount and the oxygen supply amount that are required to obtain the output that corresponds to the required load factor. As a result, it is possible to improve the fuel efficiency.

If an unnecessarily large amount of hydrogen or oxygen flows into the combustion chamber 15 and the argon concentration decreases, the specific heat ratio of the argon decreases. Therefore, when the gas in the combustion chamber is compressed in the compression stroke, the pressure and the temperature of the gas may not reach a desired pressure and a desired temperature, respectively. However, if the argon concentration is maintained sufficiently high, the pressure and the temperature of the gas are brought to the desired pressure and the desired temperature, respectively. As a result, the hydrogen self-ignites more reliably in the power stroke.

Figure 6:
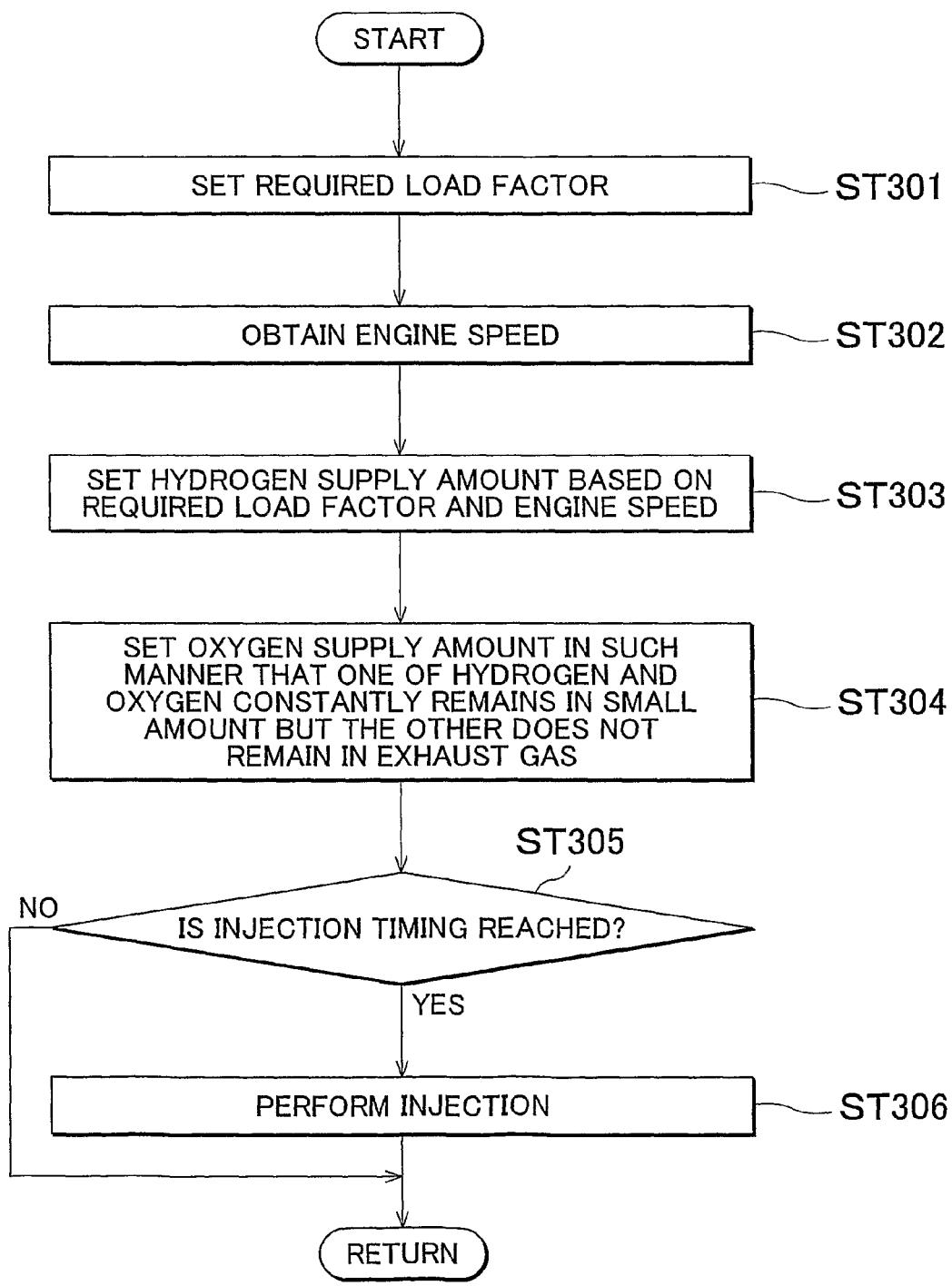
FIG. 6 is a flowchart showing the routine for controlling the engine according to a modification of the embodiment of the invention.

In the engine 1 described above, the control is executed in such a manner that the hydrogen concentration and the oxygen concentration in the exhaust gas are both equal to or lower than the reference concentration SD. Alternatively, the control may be executed in such a manner that one of the hydrogen and the oxygen is contained but the other is not contained in the exhaust gas. FIG. 6 is a flowchart showing the engine control routine according to a modification of the embodiment of the invention. Even when the control is executed in such a manner that one of the hydrogen and the oxygen is contained but the other is not contained in the exhaust gas, first, the required load factor setting unit 72 sets the required load factor (ST301), as in the engine 1 according to the embodiment of the invention. Then, the rotational speed obtaining unit 73 obtains the engine speed (ST302). Next, the supply amount setting unit 74 sets the hydrogen supply amount based on the required load factor set by the required load factor setting unit 72 and the engine speed obtained by the engine speed obtaining unit 73 (ST303).

Next, the oxygen supply amount is set in such a manner that one of the hydrogen and the oxygen constantly remains in a small amount but the other does not remain in the exhaust gas (ST304). The oxygen supply amount is set by the supply amount setting unit 74 as in the case where the hydrogen supply amount is set. In order to cause the oxygen to constantly remain in a small amount in the exhaust gas, the supply amount setting unit 74 sets the oxygen supply amount in such a manner that the hydrogen concentration in the exhaust gas is zero. In order to cause the hydrogen to constantly remain in a small amount in the exhaust gas, the supply amount setting unit 74 sets the oxygen supply amount in such a manner that the oxygen concentration in the exhaust gas is zero. That is, based on the hydrogen supply amount set by the supply amount setting unit 74, the supply amount setting unit 74 sets the amount of oxygen that is supplied from the oxygen supply device 45 to the oxygen supply amount at which the concentration of one of the hydrogen and the oxygen is zero and the concentration of the other is equal to or lower than the reference concentration SD, which is stored in the storage unit 78 in advance, after the hydrogen is burned in the combustion chamber 15.

Next, the injection timing determination unit 75 determines whether the injection timing for the hydrogen supply device 40 or the injection timing for the oxygen supply device 45 is reached (ST305). If the injection timing determination unit 75 determines in ST305 that neither the hydrogen injection timing nor the oxygen injection timing is reached, the routine ends. If the injection timing determination unit 75 determines in ST305 that the hydrogen injection timing or the oxygen injection timing is reached, the supply device control unit 76 controls the hydrogen supply device 40 or the oxygen supply device 45 to perform the injection (ST306). Which of the hydrogen injection timing and the oxygen injection timing is reached is determined by the injection timing determination unit 75. After the injection is performed, the routine ends.

As described above, if one of the hydrogen and the oxygen constantly remains in a small amount but the other does not remain in the exhaust gas, it is possible to suppress occurrence of the situation where both the hydrogen and the oxygen flow through the circulation path 30. As a result, it is possible to suppress occurrence of the situation where the hydrogen and the oxygen are mixed together in the circulation path 30 and the hydrogen self-ignites due to reaction with the oxygen in the circulation path 30.

When one of the hydrogen and the oxygen remains but the other does not remain in the exhaust gas, control may be executed with the use of the hydrogen sensor or the oxygen sensor. FIG. 7 is a flowchart showing the routine for controlling the engine according to another modification of the embodiment of the invention. Even when control is executed with the use of the hydrogen sensor 51 or the oxygen sensor 52 in the case where one of the hydrogen and the oxygen remains but the other does not remain in the exhaust gas, first, the required load factor setting unit 72 sets the required load factor (ST401), and the rotational speed obtaining unit 73 obtains the engine speed (ST402), as in the case of the engine 1 according to the embodiment of the invention. Next, the supply amount setting unit 74 sets the hydrogen supply amount based on the required load factor set by the required load factor setting unit 72 and the engine speed obtained by the rotational speed obtaining unit 73 (ST403).

Next, the hydrogen concentration in the exhaust gas is detected (ST404). In this case, the hydrogen sensor 51 provided in the circulation path 30 detects the hydrogen concentration in the exhaust gas that flows through the circulation path 30, and the supply amount setting unit 74 obtains the detected hydrogen concentration.

Next, the oxygen supply amount is set in such a manner that the oxygen remains but the hydrogen does not remain in the exhaust gas (ST405). The supply amount setting unit 74 sets the oxygen supply amount. Based on the hydrogen concentration detected by the hydrogen sensor 51 and then obtained by the supply amount setting unit 74, the supply amount setting unit 74 sets the oxygen supply amount in such a manner that the hydrogen concentration in the exhaust gas is zero and the oxygen remains in the exhaust gas at the oxygen concentration of equal to or lower than the reference concentration SD but the hydrogen does not remain in the exhaust gas. That is, the supply amount setting unit 74 sets the amount of oxygen supplied from the oxygen supply device 45 to the oxygen supply amount at which the hydrogen concentration in the exhaust gas is zero and the oxygen remains in a small amount but the hydrogen does not remain in the exhaust gas, based on the hydrogen supply amount set by the supply amount setting unit 74 and the hydrogen concentration in the exhaust gas detected by the hydrogen sensor 51.

Next, the injection timing determination unit 75 determines whether the injection timing for the hydrogen supply device 40 or the injection timing for the oxygen supply device 45 is reached (ST406). If the injection timing determination unit 75 determines in ST406 that neither the hydrogen injection timing nor the oxygen injection timing is reached, the routine ends. If the injection timing determination unit 75 determines in ST406 that the hydrogen injection timing or the oxygen injection timing is reached, the supply device control unit 76 controls the hydrogen supply device 40 or the oxygen supply device 45 to perform injection (ST407). Which of the hydrogen injection timing and the oxygen injection timing is reached is determined by the injection timing determination unit 75. After the injection is performed, the routine ends.

When the hydrogen supply amount and the oxygen supply amount are set based on the detection result obtained by the hydrogen sensor 51, it is possible to more reliably adjust the hydrogen supply amount and the oxygen supply amount to the desired supply amounts. Accordingly, it is possible to more reliably bring the hydrogen concentration and the oxygen concentration in the exhaust gas to equal to or lower than the reference concentration SD. As a result, it is possible to more reliably suppress reduction in the thermal efficiency.

When the control is executed based on the detection result obtained by the hydrogen sensor 51, even if the hydrogen supply amount set by the supply amount setting unit 74 or the oxygen supply amount set by the supply amount setting unit 74 deviates from the amount of hydrogen actually injected from the hydrogen supply device 40 or the amount of oxygen actually injected from the oxygen supply device 45, the injection amount may be corrected based on the detection result obtained by the hydrogen sensor 51. Therefore, it is possible to more accurately control the supply amounts. As a result, it is possible to more reliably bring the hydrogen concentration and the oxygen concentration in the exhaust gas to equal to or lower than the reference concentration SD. Accordingly, it is possible to more reliably suppress reduction in the thermal efficiency. In this modification, the control is executed based on the detection result obtained by the hydrogen sensor 51. Alternatively, the oxygen sensor 52 may be used as a detection device that detects the component of the exhaust gas to improve the control accuracy.

In the above-described engine 1, the hydrogen supply amount is set based on, for example, the accelerator pedal operation amount, and then the oxygen supply amount is set based on the hydrogen supply amount. Alternatively, the oxygen supply amount may be set based on, for example, the accelerator pedal operation amount, and then the hydrogen supply amount may be set. That is, as in a commonly-used engine, when the fuel is burned by causing a reaction between the fuel and the oxygen contained in the atmosphere, the output from the engine changes based on the fuel supply amount. However, as in the above-described engine 1, when both the hydrogen, used as the fuel, and the oxygen, used to burn the hydrogen, are supplied by the supply devices, the output from the engine changes based on the smaller supply amount. Namely, when the oxygen supply amount is small, the output from the engine 1 changes based on the oxygen supply amount because combustion takes place due to reaction between the oxygen and the hydrogen.

As in the above-described engine 1, when the hydrogen and the oxygen are both supplied from the supply devices, the output from the engine 1 is controlled using one of the supply amounts as the reference. Accordingly, the hydrogen supply amount may be set first and then the oxygen supply amount may be set, as described above. Alternatively, the oxygen supply amount may be set first and then hydrogen supply amount may be set. Either the hydrogen supply amount or the oxygen supply amount may be used as the reference. In the routine that is executed when the engine is being started or in the routine according to the modification described above, first, the hydrogen supply amount is set (ST202, ST403), and then the oxygen supply amount is set in such a manner that the oxygen remains but the hydrogen does not remain in the exhaust gas (ST203, ST405). Alternatively, first, the oxygen supply amount may be set, and then the hydrogen supply amount may be set in such a manner that the hydrogen remains but the oxygen does not remain in the exhaust gas.

In the description above, hydrogen is used as the reductant, and argon is used as the working gas. However, material other than hydrogen may be used as the reductant, and material other than argon may be used as the working gas. That is, gases other than hydrogen may be used as the reductant as long as the gas is in the form of gas at the normal temperature or under the usage environment of the engine 1 and is burned by reaction with the oxygen that is used as the oxidant. Also, any types of gases that have a specific heat ratio higher than that of the air may be used as the working gas. Gases other than argon may be used as the working gas. For example, rare gas other than argon may be used as the working gas.

In the engine 1 according to the embodiment of the invention, the oxygen supply ratio is made higher than the oxygen supply ratio that is used during normal engine operation only when the engine 1 is being started (ST203). However, the oxygen supply ratio may be increased not only when the engine is being started but also when the engine is being warmed up. When the temperature of the engine 1 is low, the combustion speed is low. Therefore, it is difficult to achieve ideal combustion state. However, when the engine 1 is being warmed up, if the hydrogen supply amount and the oxygen supply amount are set in such a manner that one of the hydrogen supply ratio and the oxygen supply ratio is higher than that used during the normal operation of the engine 1, the entirety of one of the oxygen and the hydrogen, which is smaller in amount than the other, reacts with the other of the oxygen and the hydrogen, and is burned. As a result, the combustion efficiency during warming-up of the engine 1 is improved.

In the above-described engine 1, the argon and the oxygen are taken in the combustion chamber 15 and compressed, and the hydrogen, which is used as the fuel, is supplied into the combustion chamber 15 in the state where the temperature of the gas in the combustion chamber 15 is increased due to the compression. As a result, the hydrogen self-ignites. Alternatively, for example, a spark plug may be provided in the combustion chamber 15, and the fuel may be ignited by the spark plug. In this case, the hydrogen supply device 40 and the oxygen supply device 45 may be direct injection supply devices that directly inject fuel into the combustion chamber 15. Alternatively, the hydrogen supply device 40 and the oxygen supply device 45 may be port injection supply devices that inject fuel into the circulation path 30 that serves also as the intake passage.

As described above, the invention is effective for an internal combustion engine including a circulation path. Especially, the invention is effective for an internal combustion engine that uses gas fuel.

The invention claimed is:

1. An internal combustion engine, comprising:
   an oxidant supply device that supplies an oxidant into a combustion chamber;

a reductant supply device that supplies a reductant, which is burned by reaction with the oxidant, into the combustion chamber;

a circulation path which is communicated at both ends with the combustion chamber, into which exhaust gas generated after the reductant is burned in the combustion chamber flows through one of the both ends, from which gas that is taken in the combustion chamber flows into the combustion chamber through the other end, and through which working gas which is gas that has a specific heat ratio higher than a specific heat ratio of air and that is circulated back to the combustion chamber flows; and a supply amount setting unit that sets a supply amount of the reductant and a supply amount of the oxidant, wherein when the internal combustion engine is in a predetermined operating state, the supply amount setting unit sets the supply amount of the reductant and the supply amount of the oxidant in such a manner that one of a ratio of the supply amount of the reductant to the supply amount of the oxidant and a ratio of the supply amount of the oxidant to the supply amount of the reductant is higher than the one of the ratios used during normal operation.

2. The internal combustion engine according to claim 1, wherein the supply amount setting unit sets the supply amount of the reductant and the supply amount of the oxidant in such a manner that a concentration of the reductant in the exhaust gas and a concentration of the oxidant in the exhaust gas are both equal to or lower than a predetermined concentration.

3. The internal combustion engine according to claim 1, wherein the predetermined operating state includes a state where the internal combustion engine is being started.

4. The internal combustion engine according to claim 3, wherein the predetermined operating state includes a state where the internal combustion engine is being warmed up.

5. The internal combustion engine according to claim 1, wherein the supply amount setting unit sets the supply amount of the reductant and the supply amount of the oxidant in such a manner that one of the reductant and the oxidant is constantly contained in the exhaust gas but the other of the reductant and the oxidant is not contained in the exhaust gas during normal operation of the internal combustion engine.

6. The internal combustion engine according to claim 1, wherein:

a concentration detection unit that detects at least one of concentrations of the reductant and the oxidant in the exhaust gas that flows through the circulation path is provided in the circulation path; and the supply amount setting unit sets the supply amount of the reductant and the supply amount of the oxidant based on a detection result obtained by the concentration detection unit.

7. The internal combustion engine according to claim 1, wherein one of the supply amount of the reductant and the supply amount of the oxidant is set first, and then the other of the supply amount of the reductant and the supply amount of the oxidant is set based on the supply amount that is set first.

8. The internal combustion engine according to claim 1, wherein:

the oxidant is oxygen;
the reductant is hydrogen; and
the working gas is argon.

9. The internal combustion engine according to claim 1, wherein the oxidant supply device is arranged in such a manner that the oxidant supply device supplies the oxidant to the combustion chamber by injecting the oxidant into the circulation path.

10. A method for controlling an internal combustion engine that includes an oxidant supply device that supplies an oxidant into a combustion chamber, a reductant supply device that supplies a reductant, which is burned by reaction with the oxidant, into the combustion chamber, and a circulation path which is communicated at both ends with the combustion chamber, into which exhaust gas generated after the reductant is burned in the combustion chamber flows through one of the both ends, from which gas that is taken in the combustion chamber flows into the combustion chamber through the other end, and through which working gas which is gas that has a specific heat ratio higher than a specific heat ratio of air and that is circulated back to the combustion chamber flows, the method comprising:

setting a supply amount of the reductant and a supply amount of the oxidant, wherein when the internal combustion engine is in a predetermined operating state, the supply amount of the reductant and the supply amount of the oxidant are set in such a manner that one of a ratio of the supply amount of the reductant to the supply amount of the oxidant and a ratio of the supply amount of the oxidant to the supply amount of the reductant is higher than the one of the ratios used during normal operation.

11. The method according to claim 10, wherein the supply amount of the reductant and the supply amount of the oxidant are set in such a manner that a concentration of the reductant in the exhaust gas and a concentration of the oxidant in the exhaust gas are both equal to or lower than a predetermined concentration.

12. The method according to claim 10, wherein the predetermined operating state includes a state where the internal combustion engine is being started.

13. The method according to claim 12, wherein the predetermined operating state includes a state where the internal combustion engine is being warmed up.

14. The method according to claim 10, wherein the supply amount of the reductant and the supply amount of the oxidant are set in such a manner that one of the reductant and the oxidant is constantly contained in the exhaust gas but the other of the reductant and the oxidant is not contained in the exhaust gas during normal operation of the internal combustion engine.

15. The method according to claim 10, wherein the supply amount of the reductant and the supply amount of the oxidant are set based on a detection result obtained by a concentration detection unit that is provided in the circulation path and that detects at least one of concentrations of the reductant and the oxidant in the exhaust gas that flows through the circulation path.

16. The method according to claim 10, wherein one of the supply amount of the reductant and the supply amount of the oxidant is set first, and then the other of the supply amount of the reductant and the supply amount of the oxidant is set based on the supply amount that is set first.

17. The method according to claim 10, wherein:

the oxidant is oxygen;
the reductant is hydrogen; and
the working gas is argon.

18. The method according to claim 10, wherein the oxidant supply device supplies the oxidant to the combustion chamber by injecting the oxidant into the circulation path.

* * * * *